United States Patent [19] [11] 4,126,057
von Allwörden et al. [45] Nov. 21, 1978

[54] ADJUSTABLE LENGTH UPPER GUIDE MEMBER

[75] Inventors: Wilhelm von Allwörden, Erbach i.O.; Hubert Geisthoff, Lohmar, both of Fed. Rep. of Germany

[73] Assignee: Jean Walterscheid GmbH, Lohmar, Fed. Rep. of Germany

[21] Appl. No.: 779,615

[22] Filed: Mar. 21, 1977

[30] Foreign Application Priority Data

Apr. 30, 1976 [DE] Fed. Rep. of Germany ....... 2619031

[51] Int. Cl.² .............................................. G05G 1/04
[52] U.S. Cl. ...................................... 74/586; 280/482; 403/107
[58] Field of Search .................. 74/424.8 A, 582, 586; 280/482; 403/107, 109, 322, 366, 367, 377

[56] References Cited

U.S. PATENT DOCUMENTS

| 721,023 | 2/1903 | Cosper | 74/424.8 A X |
| 1,185,127 | 5/1916 | Ollard | 74/424.8 A X |
| 1,321,942 | 8/1919 | Anderson | 74/424.8 A |
| 2,887,929 | 5/1959 | Farmer | 403/109 X |
| 3,157,416 | 11/1964 | Sandbakken | 280/482 X |
| 3,384,937 | 5/1968 | Muncke | 280/482 X |
| 3,837,753 | 9/1974 | Weiste | 280/482 X |

Primary Examiner—Gary L. Smith
Attorney, Agent, or Firm—Edmund M. Jaskiewicz

[57] ABSTRACT

An adjustable length upper guide member for the hitch attachment of a tractor has an outer tubular guide element within which is telescopingly positioned an inner guide element so as to be relatively displaceable thereto. A housing on the outer guide element has a pair of jaws pivotally mounted therein and the jaws each have first arms which are engageable with annular grooves on the inner guide element and second arms which form actuating cams facing each other. A lever has an eccentric portion within the housing and one side of the eccentric portion is engageable against the housing and the other side of the eccentric portion engageable with the actuating cams so that pivoting of the lever causes the eccentric portion to act upon the cams and pivot the jaws to a disengaged position.

9 Claims, 4 Drawing Figures

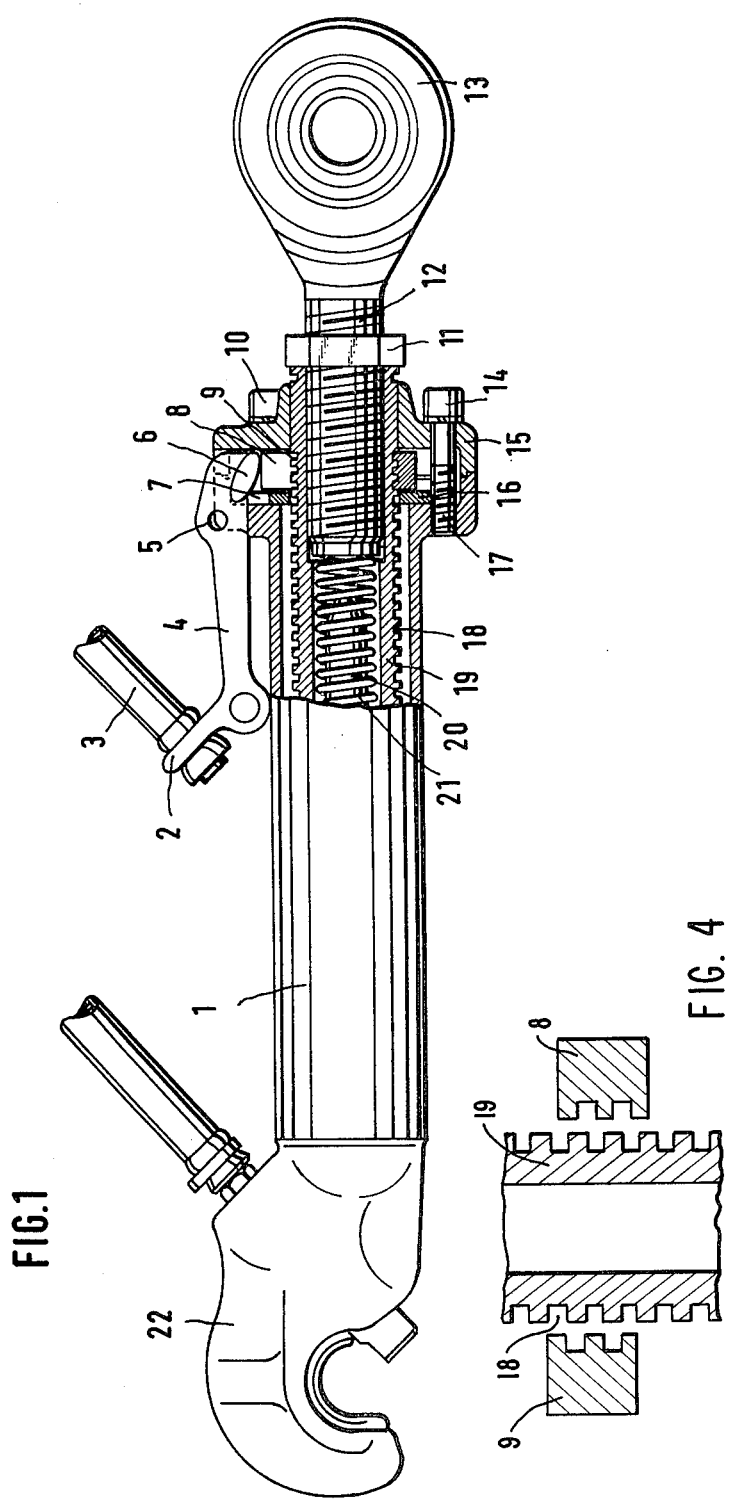

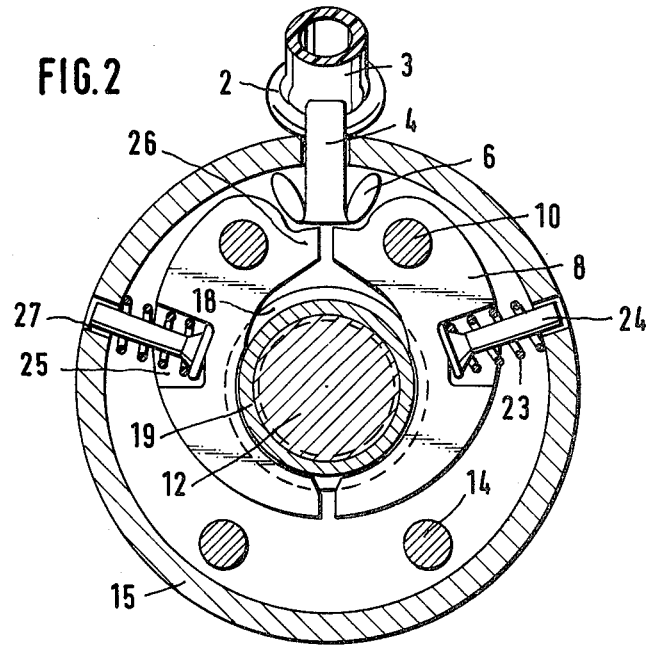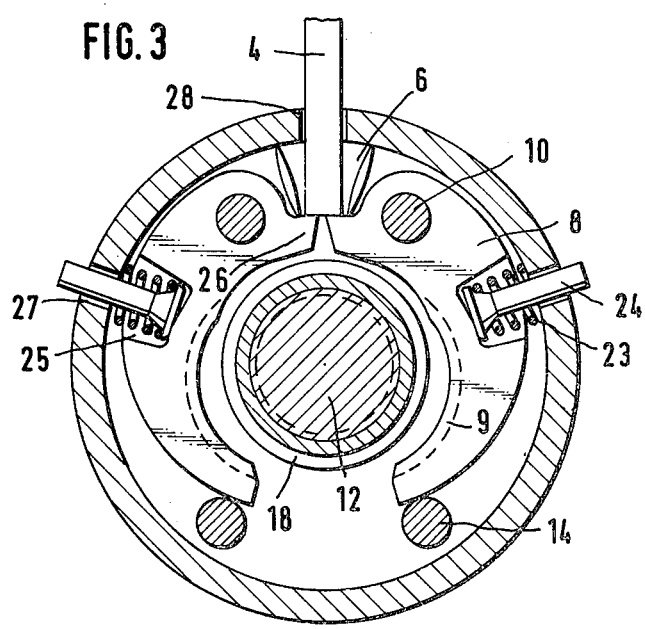

ADJUSTABLE LENGTH UPPER GUIDE MEMBER

The present invention relates to an adjustable upper guide member for the hitch attachment of a tractor, more particularly, to the structure for securing the guide elements in axial adjusted position with respect to each other.

The three-point attachment on the rear of a tractor to which is connected an implement or other machine to be towed by the tractor is generally provided with an upper guide member which has an adjustable length. The upper guide member comprises a pair of relatively slidable telescopingly positioned guide elements which can be positioned longitudinally with respect to each other by locking jaws on the tubular outer guide element engaging with annular grooves on the outer surface of the inner guide element. The jaws are pivotally mounted in an enclosure or housing which is attached to the outer tubular guide element and springs are generally provided for maintaining the jaws in their operatively engaged positions agains the grooves of the inner guide element. An operating lever is connected by suitable linkage to the jaws so that actuation of the lever will disengage in the jaws and permit relative displacement between the outer and inner guide elements.

One form of such an upper guide member is disclosed in the German Gebrauchsmuster No. 7,416,431 which has an acuating lever mounted on particular pivot mounts provided on the housing for the locks and operatively cooperating with outwardly projecting actuating bolts on the locking jaws. This actuating mechanism has the disadvantage of a comparatively short effective lever arm with respect to the pivot axis of the locking jaws. Further, this structure is relatively complicated and expensive to manufacture with respect to the pivotable mounting of the actuating lever. In addition, the mechanism requires considerable effort for operation. A further disadvantage is that the bolts employed for actuation of the locking jaws project outwardly from the housing for the jaws and the lever attached to the bolts also projects from the housing. These exposed positions of the bolts and lever subject these components to the constant risk of being damaged so as to prevent proper functioning of the mechanism. In practice, the mechanism became unsafe and unreliable in operation after longer periods of active service operation.

It is therefore the principal object of the present invention to provide a novel and improved adjustable length upper guide member for the hitch attachment of a tractor.

It is another object of the present invention to provide such an upper guide member wherein actuation of the locking jaws is facilitated and the locking structure requires a minimum of labor and materials for construction.

It is a further object of the present invention to provide such an upper guide member wherein the major components of the locking mechanism are protected so as to minimize damage to these components and to provide reliable and safe operation for long periods of service.

According to one aspect of the present invention an adjustable length upper guide member for the hitch attachment of an agricultural tractor and the like may comprise an inner guide element telescopingly positioned in an outer tubular guide element so that the guide elements are relatively displaceable with respect to each other. A housing on the outer guide element has a pair of jaws pivotally mounted therein with each jaw having first and second arms. The first arms of the jaws are engageable with annular grooves on the outer surface of the inner guide element in the locking position. A lever has an eccentric portion within the housing with one side of the eccentric portion engageable against the housing and the other side of the eccentric portion being engageable with actuating cams defined on the second arms of the jaws.

The locking jaws may be urged by springs into their locking or engaging positions and pins may be loaded by the springs so as to project from the housing when the jaws are disengaged to provide visual indication of the disengaged condition of the jaws.

Other objects and advantages of the present invention will be apparent upon references to the accompanying description when taken in conjunction with the following drawings which are exemplary, wherein:

FIG. 1 is an elevational view with a portion thereof in longitudinal section of an adjustable length guide member according to the present invention;

FIG. 2 is a sectional view taken along the line II—II of FIG. 1 and showing the locking mechanism in the closed or locked position;

FIG. 3 is a view similar to that of FIG. 2 but showing the mechanism in the open or disengaged position;

FIG. 4 is an axial sectional view showing an alternative embodiment of the locking jaws and grooves on the inner guide element.

Proceeding next to the drawings wherein like reference symbols indicate the same parts throughout the various views a specific embodiment and modifications of the present invention will be described in detail.

In FIG. 1, there is illustrated an adjustable length upper guide member for the hitch attachment of a tractor and the like which comprises an outer tubular guide element 1 having on one end thereof a coupling hook 22 and on its other or open end there is a housing 7. Inserted into the open end of the tubular outer element 1 is an inner guide element 19 which has a plurality of annular grooves 18 along its outer peripheral surface. The inner guide element is tubular in construction and encloses a guide bar 20 which is rigidly connected with the outer tubular element 1 such as by having an end, not shown in the drawing, attached directly to the coupling hook 22. A compression spring 21 surrounds the guide bar 20 and has one end bearing against the coupling hook 22 and the other end engaging the inner end portion of a threaded spindle shaft 12 screwed into the end of the inner guide element 19. The outer end of the threaded shaft 12 is provided with a counternut 11 and a coupling socket or eye 13.

The housing 7 which may be integral with the tubular outer element 1 or attached thereto such as by welding is closed by a cover 15 which is attached to the housing 7 by pairs of bolts 10 and 14 threadedly received in bores 17 formed in the housing 7. The housing 7 is provided with a slot 28 through which extends an operating lever 4. One end of the lever 4 which defines a shorter lever arm is received within the housing 7 and is provided with an eccentric portion having two sides 6. The longer lever portion of the lever 4 is provided on its end with an eye socket 2 to which is attached a flexible tubular element 3 which extends toward the seat of the tractor and is pulled by the tractor operator to actuate the locking mechanism in a manner to be presently described. The longer lever portion of the lever 4 outwardly of the housing 7 is also provided with a bore 5 which may receive a pin so that the lever can be secured in a position wherein the locking mechanism is disengaged.

A pair of locking jaws 8 are pivotally mounted within the housing 7 upon the bolts 10 and the opening or disengaging movement of the jaws 8 is limited by abutting against the bolts 14 as may be seen in FIG. 3.

Each locking jaw 8 is pivotally mounted so as to define a two-armed lever having a longer arm 9 whose inner surface is grooved so as to conform and thus closely fit upon the annular grooves 18 of the inner guide element 19. The other or shorter arm of each locking jaw 8 forms a cam actuating portion or arm 26. The cam actuating portions of both locking jaws are positioned facing each other and are engageable by the eccentric portion 6 on the shorter lever arm of the lever 4. The eccentric portion 6 has two sides one of which is engageable with the inner surface of the housing and the other side engageable with the actuating cams of the jaws.

The outer surface of each locking jaw 8 which faces the inner wall of the lock housing 7 is provided with a recess 25 in which is accommodated a spring-loaded pin or bolt 24 and its spring 23. Thus, the inner end of each pin 24 is received within the recess 25 and the opposite or outer end of each pin projects through a bore 27 in the cover portion 15 of the lock housing.

A spacer ring 16 is positioned within the lock housing 7 to prevent undue withdrawal of the inner guide element 19 with respect to the outer guide element 1 by engaging with an abutment surface provided on the end of the inner guide element 19 directed toward the coupling hook 22.

When it is desired to couple the adjustable length upper guide member of the present invention with a coupling pin on an implement or machine, the tractor upon which the upper guide member is mounted is driven in its reverse direction toward the implement to be coupled. From his seat, the tractor operator pulls the actuating cable 3 so as to lift the eccentric lever 4 in such a manner that the eccentric portion 6 of the lever within the housing 7 and having one side engaged with the inner surface of the housing 7 will apply a downwardly directed force toward the two actuating cam portions 26 of the locking jaws 8. The jaws 8 will then pivot upon their bolts 10 to their positions as seen in FIG. 3 wherein the locking portions 9 are disengaged from the annular grooves 18 of the inner guide element 19. The compression spring 21 will then push the inner guide element 19 outwardly from the outer guide element 1 to establish the required length for coupling. During the lateral pivoting of the jaws 8 to their disengaged positions, the pins 24 will be forced outwardly through the bores 27 while the locking springs 23 are compressed. The pins 24 will thus protrude visibly on the exterior of the lock housing 7 of the outer guide element so as to indicate visually that the length adjusting mechanism of the upper guide member is now unlocked or disengaged.

Under certain operating conditions, it may be desireable that when the lever 4 is raised to its open position a pin or bolt is inserted through the bore 5 in the lever 4 such that the lever 4 will be locked in the disengaged position and the jaws 8 cannot engage the inner guide element under the action of the springs 23. The springs 23 are positioned to constantly urge the locking jaws 8 toward the locked or engaged position. The upper guide member can now be described as being in a floating position and is thus capable of adapting to any length variation without being obstructed by the locking jaws 8. The use of such a floating guide member is an important operational requirement for certain types of equipment operating in conjunction with the tractor.

In normal service, the use of a pin in the bore 5 of the lever 4 will not be required. After the upper guide member has been adjusted to the required length, the tractor operator will release the actuating tubular element 3 and the locking springs 23 will force the jaws 8 back into locking engagement with the grooves 18 of the inner guide element 19. The springs 23 actually act against the pins 24 which will pivot the jaws 8 back into locking engagement such that the locking portions 9 again positively and precisely engage with the annular grooves 18 so as to prevent all relative axial sliding movement between outer guide element 1 and inner guide element 19.

The eccentric portion 6 of the lever 4 will be returned to its initial position as shown in FIGS. 1 and 2 under the action of the actuating cam portions 26 during the pivoting movement of the jaws 8 into their operating positions. When the jaws 8 are in their locked positions, the pins 24 will no longer protrude above the outer surface of the outer guide element to indicate visually and positively to the tractor operator that the upper guide member is now locked fast against longitudinal adjustment.

It is pointed out that the housing for the locking mechanism comprises one portion 7 which is connected directly to the outer guide element 1 and a cover element 15 which is bolted to the portion 7 with threaded bolts which also function as pivot mounts for the locking jaws and as stops for the movement of the locking jaws to their disengaged positions. The multiple functions thus performed by the fastening bolts simplifies the structure of the locking mechanism and reduces to a minimum the number of components required.

In order to provide for a finer adjustment of the length of the upper guide member, the locking cam portions 9 of the locking jaws may be axially offset with respect to each other by a maximum distance of one-half of the pitch between successive grooves 18 on the inner guide element 19 as shown in FIG. 4. This structure is possible because the locking jaws 8 are capable of locking engagement relatively independently of each other so that one locking jaw may be in operative locking engagement with the inner guide element while the other locking jaw is disengaged therefrom.

Thus it can be seen that the present invention has provided an upper guide member having a simpler but more reliable locking mechanism which eliminates complex supporting or bearing structure for the actuating lever. In addition, the use of the actuating cams on the eccentric portion of the lever provides an effective lever arm for disengaging movement which is relatively long and which thus results in a corresponding reduction in the force actually required to actuate the locking mechanism. Further, all of the actuating elements for the locking jaws are all accommodated within a lock housing structure so that the jaws and their mounting points are not exposed to the likelihood of damage during operation. Since the locking jaws are not functionally coupled to each other they can be individually moved into operative locking positions.

It will be understood that this invention is susceptible to modification in order to adapt it to different usages and conditions, and accordingly, it is desired to comprehend such modifications within this invention as may fall within the scope of appended claims.

What is claimed is:

1. An adjustable length upper guide member for the hitch attachment of a tractor comprising an outer tubular guide element and an inner relatively displaceable guide element telescopingly positioned therein, said inner guide element having annular grooves on its outer surface, a housing on said outer guide element, a pair of jaws pivotally mounted within said housing to define first and second arms on each jaw, the first arms of said jaw being engageable with the annular grooves on said inner guide element, said second arms defining actuating cams facing each other, and a lever having a longer end extending outwardly of said housing and one end extending into said housing and an eccentric portion on said one end with two sides within said housing, one of said sides engageable against the inner surface of said housing and the other of said sides engageable with the actuating cams of said jaws such that when the long end of the lever is pivoted said one side of said eccentric portion will apply a force urging the other of said sides against said actuating cams of the jaws to disengage the jaws from the annular grooves on said inner guide element.

2. An adjustable length upper guide member as claimed in claim 1 wherein said housing has a slot therein and said lever extends through said slot.

3. An adjustable length upper guide member as claimed in claim 1 wherein said housing comprises a first portion attached to said outer guide element and a cover portion connected to said first portion.

4. An adjustable length upper guide member as claimed in claim 3 and further comprising a plurality of bolts connecting said cover portion to said first portion, said jaws being pivotally mounted on two of said bolts, further of said bolts being positioned to limit the pivoting movement of said jaws to positions disengaged from said inner guide element grooves.

5. An adjustable length upper guide member as claimed in claim 1 wherein said tubular outer guide element has one end into which the inner guide element is positioned, said housing being mounted on said one end of said outer guide element.

6. An adjustable length upper guide member as claimed in claim 1 and further comprising means for securing said lever in a position in which said jaws are disengaged from said inner guide element grooves.

7. An adjustable length upper guide member as claimed in claim 1 wherein the first arms of said jaws have teeth engageable with said annular grooves, said first arms being axially offset with respect to each other a maximum of one-half the pitch of their teeth.

8. An adjustable length upper guide member as claimed in claim 1 and further comprising spring means urging said jaws into engagement with the annular grooves on said inner guide element.

9. An adjustable length upper guide member as claimed in claim 1 and further comprising pins having spring-loaded means on said housing engageable with said jaws and extending outwardly of said housing when said jaws are in the disengaged positions.

* * * * *